United States Patent [19]
Ogino

[11] Patent Number: 5,852,467
[45] Date of Patent: Dec. 22, 1998

[54] IMAGE SIGNAL RECORDING APPARATUS CONTROLLING THE TRANSFER OF IMAGE DATA FROM TEMPORARY MEMORY TO NON-VOLATILE MEMORY

[75] Inventor: Hiroyuki Ogino, Yokohama, Japan

[73] Assignee: Canon Kabushiki Kaisha, Tokyo, Japan

[21] Appl. No.: 815,992

[22] Filed: Mar. 10, 1997

Related U.S. Application Data

[63] Continuation of Ser. No. 465,570, Jun. 5, 1995, abandoned, which is a continuation of Ser. No. 114,964, Sep. 2, 1993, abandoned.

[30] Foreign Application Priority Data

Sep. 9, 1992 [JP] Japan .................................... 4-266593

[51] Int. Cl.$^6$ ....................................................... H04N 5/76
[52] U.S. Cl. .......................... 348/231; 348/233; 386/35; 396/321
[58] Field of Search .................................... 348/231, 232, 348/233, 207, 374, 375; 358/906, 909.1; 396/321; 386/33, 35, 40, 109, 113

[56] References Cited

U.S. PATENT DOCUMENTS

| | | | |
|---|---|---|---|
| 5,016,107 | 5/1991 | Sasson et al. | 358/209 |
| 5,027,214 | 6/1991 | Fujimori | 348/233 |
| 5,032,918 | 7/1991 | Ota et al. | . |
| 5,034,804 | 7/1991 | Sasaki | 358/41 |

*Primary Examiner*—Bipin Shalwala
*Attorney, Agent, or Firm*—Fitzpatrick, Cella, Harper & Scinto

[57] ABSTRACT

An image signal recording apparatus controlling the transfer of image data from temporary memory to non-volatile memory obtains an image of an object, inputs an image signal corresponding to the obtained image, and temporarily stores the input image signal. When it has been detected that an image signal corresponding to a storable capacity of the temporary storage has been input, the subsequent photographing operation is prohibited. It is thereby possible to securely store an image signal corresponding to an obtained image of an object.

58 Claims, 6 Drawing Sheets

IMAGE SIGNAL RECORDING APPARATUS CONTROLLING THE TRANSFER OF IMAGE DATA FROM TEMPORARY MEMORY TO NON-VOLATILE MEMORY

This application is a continuation of application Ser. No. 08/465,570 filed Jun. 5, 1995, which is a continuation of application Ser. No. 08/114,964, filed Sep. 2, 1993, both now abandoned.

BACKGROUND OF THE INVENTION

1. Field of the Invention

This invention relates to an image signal recording apparatus for recording image signals.

2. Description of the Related Art

Digital cameras are known in which an optical image of an object incident from a photographing lens is subjected to photoelectric conversion by a solid-state image pickup device (such as a CCD (charge-coupled device) or the like), an image signal (analog signal) obtained as a result of the photoelectric conversion is subjected to A/D (analog-to-digital) conversion, and the resultant signal is recorded in a storage medium.

In such digital cameras, image data is first stored in a buffer memory (a volatile memory), and is then transferred to and recorded and stored on a hard disk (a non-volatile memory).

Since the image data stored in the buffer memory is recorded and stored on the hard disk after being transferred thereto, the data stored in the buffer memory can be erased, for example, by being overwritten, and new image data can be stored in the buffer memory.

However, image data stored in the buffer memory after the hard disk has been filled up with image data cannot be stored in the hard disk, and such image data is destroyed by turning off electric power to the camera.

If the camera is configured such that the hard disk is started every time image data stored in the buffer memory is transferred thereto, a long time is needed to start the hard disk, and the number of the starting operations is limited if the camera is driven by a battery. Hence, such a configuration is disadvantageous. On the other hand, if the camera is configured such that the hard disk always operates, then the hard disk is rotatably driven even when a photographing operation is not to be performed, causing a waste of electric power.

In addition, the following problem is present during a continuous photographing operation. That is, since the speed of storing image data in the buffer memory is high during a continuous photographing operation, the capacity of the buffer memory is filled up before transferring the image data stored in the buffer memory to the hard disk even if it is arranged to instantaneously transfer stored image data. Accordingly, when the capacity of the buffer memory has been filled up, it is necessary to interrupt the photographing operation until a storable area is present in the buffer memory by transferring image data stored in the buffer memory to the hard disk. On the other hand, if the speed of storing the image data in the buffer memory is reduced, the capacity of the buffer memory will not be filled up before transferring stored image data to the hard disk, but the speed of a continuous photographing operation is reduced. Conventionally, while the transfer speed differs depending on the kind of non-volatile memory (such as a hard disk, a memory card, a magnetic tape or the like), the transfer speed is always constant and cannot be changed in accordance with the kind of non-volatile memory, causing a disadvantage in the speed of a continuous photographing operation.

SUMMARY OF THE INVENTION

It is an object of the present invention to provide an image signal recording apparatus which can overcome the above-described problems.

It is another object of the present invention to provide an image signal recording apparatus which can securely store an image signal representing an obtained image of an object.

According to one aspect of the present invention, an image signal recording apparatus for recording image signals comprises image pickup means for obtaining an image of an object and for outputting an image signal corresponding to the obtained image, first memory means for temporarily storing the image signal output from the image pickup means and for outputting the stored image signal, detection means for detecting when the image pickup means has output an image signal corresponding to a storable capacity of the first memory means, and image-pickup-operation prohibition means for prohibiting an image-pickup operation of the image pickup means when the detection means has detected that the image pickup means has output the image signal corresponding to the storable capacity of the first memory means.

It is still another object of the present invention to provide an image signal recording apparatus which can efficiently output temporarily stored image signals.

According to another aspect of the present invention, an image signal recording apparatus for recording image signals comprises first memory means for inputting image signals, for temporarily storing the input image signal and for outputting the stored image signal, second memory means for storing the image signal output from the first memory means, determination means for determining whether or not the amount of image signals temporarily stored in the first memory means has reached a predetermined amount, and image signal transfer instruction means for providing an instruction to cause the transfer of the image signals temporarily stored in the first memory means to the second memory means when the determination means has determined that the amount of the image signals temporarily stored in the first memory means has reached the predetermined amount.

It is yet another object of the present invention to provide an image signal recording apparatus which can store image signals representing obtained images of objects while performing an optimum image-pickup operation without interrupting an image-pickup operation.

According to still another aspect of the present invention, an image signal recording apparatus for recording image signals comprises image pickup means for obtaining images of objects and for sequentially and continuously outputting image signals corresponding to the obtained images in units of a picture frame, first memory means for temporarily storing the image signals output from the image pickup means and for outputting the stored image signals, second memory means for storing the image signals output from the first memory means, and control means for causing image signals temporarily stored in the first memory means to be output to the second memory means at a speed lower than a speed of outputting image signals from the image pickup means so as to gradually increase the amount of image signals stored in the first memory means, and for prohibiting an image-pickup operation of the image pickup means when the amount of image signals stored in the first memory has equaled a remaining storable amount of image signals in the second memory means.

These and other objects, advantages, and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described with reference to the drawings.

Figure 1:
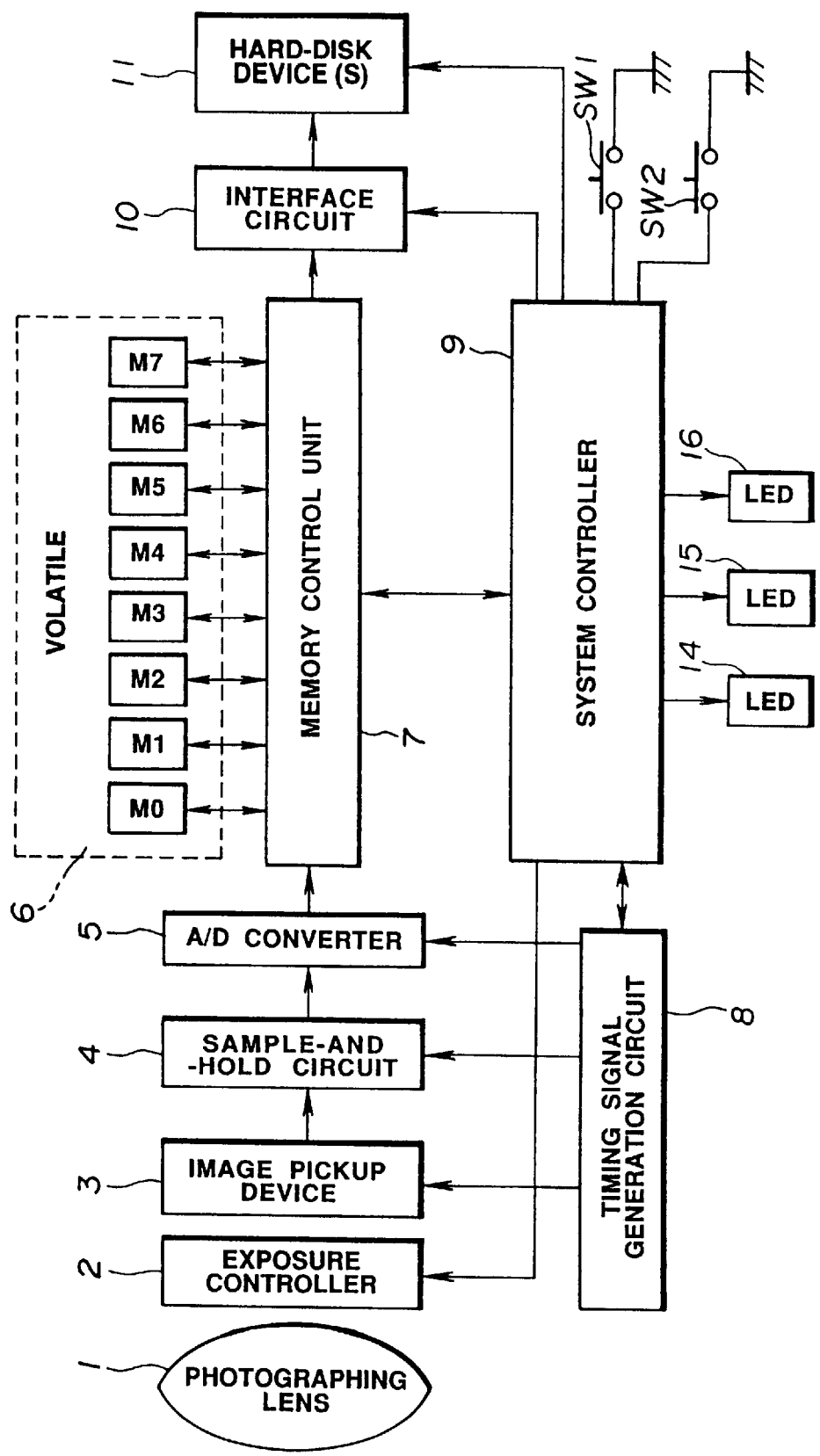
FIG. 1 is a block diagram illustrating the schematic configuration of an electronic camera according to a first embodiment of the present invention.

FIG. 1 is a block diagram illustrating the schematic configuration of an electronic camera according to a first embodiment of the present invention.

As shown in FIG. 1, this electronic camera includes photographing lens 1, exposure controller 2 (such as a shutter having a stop function, or the like), image pickup device 3 (such as a CCD or the like), sample-and-hold circuit 4, A/D converter 5, volatile internal memory 6, memory control unit 7, timing signal generation circuit 8, system controller 9, interface circuit 10, and detachable non-volatile hard-disk device or devices 11. As indicated by symbols M0–M7 in FIG. 1, internal memory 6 has a storage capacity so that image data for eight picture frames can be stored.

Various kinds of switches, such as switch SW1, switch SW2 and the like, are connected to system controller 9. When switch SW1 has been switched on, the stop value of the camera is controlled by exposure controller 2, and preparation for a photographing operation (such as determination of the shutter speed and the like), is performed. When switch SW2 has been switched on, the shutter is opened, and thus the photographing operation is executed.

LED's (light-emitting diodes) 14, 15 and 16 provided within the viewfinder of the camera are connected to system controller 9. When switch SW2 has been switched on when the remaining capacity of internal memory 6 equals "0", LED 14 is turned on in order to warn the photographer of the incapability of a photographing operation. When the accumulated amount of data stored in internal memory 6 has reached the maximum amount and the remaining storable amount of hard-disk device 11 becomes less than or equal to the maximum capacity of internal memory 6, LED 15 is turned on in order warn the photographer of the incapability of a subsequent photographing operation (i.e., the next picture cannot be stored on the hard disk). LED 16 is turned on in order to indicate that hard-disk device 11 operates.

When an exposure operation has been performed under the control of exposure controller 2, an optical image of an object from photographing lens 1 is incident upon image pickup device 3, in which the image is subjected to photo-electric conversion and is output as an analog image signal. Sample-and-hold circuit 4 samples and holds the analog image signal from image pickup device 3. A/D converter 5 performs A/D conversion of the sampled and held image signal. The image signal after the A/D conversion is first stored in internal memory 6 under the control of memory control unit 7, and is then recorded and stored in hard-disk device 11 via interface circuit 10.

At that time, image pickup device 3, sample-and-hold circuit 4 and A/D converter 5 operate in timing with timing signals generated by timing signal generation circuit 8. Memory control circuit 7 also controls refreshing operations for volatile internal memory 6.

Figure 2:
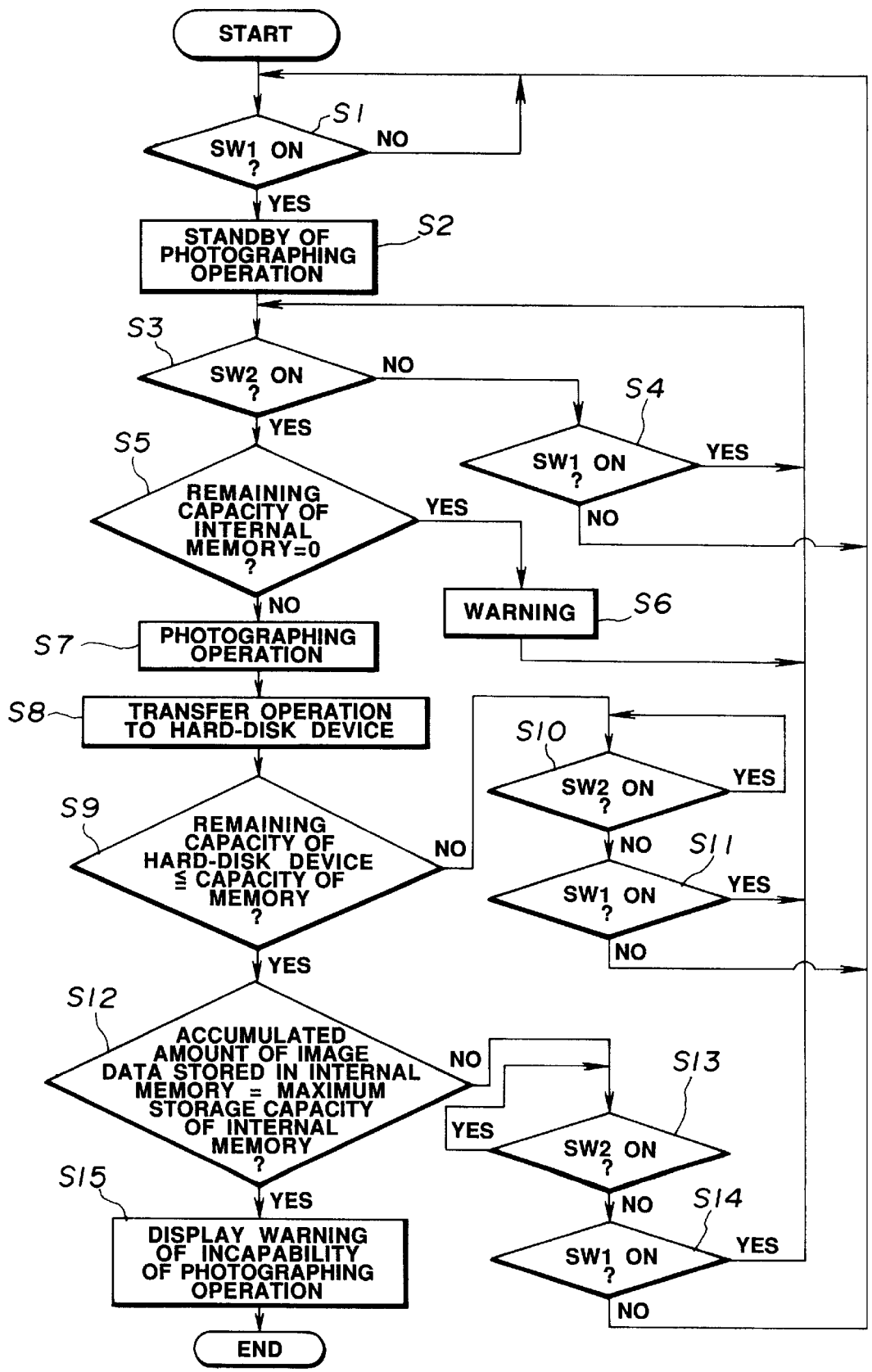
FIG. 2 is a flowchart illustrating a photographing operation of the electronic camera of the first embodiment.

Next, a description will be provided of a photographing operation of the electronic camera with reference to the flowchart of FIG. 2.

System controller 9 first awaits a detection that switch SW1 is switched on (step S1), performs a photometric operation when switch SW1 has been switched on, and assumes a standby state of a photographing operation, in which, for example, the stop value and shutter speed are determined based on the result of the photometric operation (step S2). System controller 9 then determines whether or not switch SW2 is switched on (step S3). If the result of the determination is negative, system controller 9 determines whether or not switch SW1 is switched on (step S4). If the result of the determination in step S4 is affirmative, the process returns to step S3. If the result of the determination in step S4 is negative, the process returns to step S1.

If the result of the determination in step S3 is affirmative, system controller 9 determines whether or not the remaining capacity of internal memory 6 equals "0" (step S5). If the result of the determination is affirmative, LED 14 is turned on in order to warn the photographer of that fact (step S6), and the process returns to step S3. If the result of the determination in step S5 is negative, a photographing operation is executed. That is, the shutter is opened by the control of exposure controller 2, and image data obtained from the image pickup device 3, sample-and-hold circuit 4 and A/D converter 5 is first stored in internal memory 6 (step S7). The image data stored in internal memory 6 is then transferred to hard-disk device 11 via interface circuit 10 (step S8). At that time, system controller 9 also outputs a starting signal (for starting hard-disk device 11) to hard-disk device 11, and turns on LED 16 in order to indicate that hard-disk device 11 operates.

After the transfer of the image data, system controller 9 determines whether or not the remaining capacity of hard-disk device 11 becomes less than or equal to the storage capacity (corresponding to eight picture frames) of internal memory 6 (step S9). If the result of the determination is negative, system controller 9 first confirms that switch SW2 is switched off (step S10), and then confirms that switch SW1 is switched on (step S11). If the result of the determination in step S11 is affirmative, the process returns to step S3. If the result of the determination in step S11 is negative, the process returns to step S1.

If the result of the determination in step S9 is affirmative, system controller 9 determines whether or not the accumulated amount of image data stored in internal memory 6 has reached the storage capacity of internal memory 6 after the remaining capacity of hard-disk device 11 has equaled the storage capacity of internal memory 6 (step S12). If the result of the determination is negative, system controller 9 first confirms that switch SW2 has been switched off (step S13), and then determines whether or not switch SW1 is switched on (step S14). If the result of the determination is affirmative, the process returns to step S3. If the result of the determination is negative, the process returns to step S1.

If the result of the determination in step S12 is affirmative, it indicates that the remaining capacity of hard-disk device 11 equals "0" and the corresponding image data cannot be transferred to hard-disk device 11 even if the subsequent photographing operation is performed. Hence, LED 15 is turned on in order to warn the photographer of the incapability of the subsequent photographing operation (step S15), and the process is terminated.

As described above, since the subsequent photographing operation is prohibited after the remaining capacity of hard-disk device 11 has equaled "0", the corresponding image data cannot be transferred and stored in hard-disk device 11. Thus, it is possible to prevent wasteful photographing operations in which images to be erased when electric power for the camera is turned off are photographed.

Although in the above-described first embodiment, a case of a single-shot photographic operation has been illustrated, the subsequent photographing operations after the remaining capacity of hard-disk device 11 has equaled "0" can also be prohibited by the same processing in a continuous photographing operation.

When transferring image data to hard-disk device 11 in units of a predetermined number of picture frames instead of transferring image data every time a photographing operation is performed, the remaining capacity of hard-disk device 11 may first be checked, the accumulated amount of image data stored in internal memory 6 may be checked at every subsequent photographing operation, and the subsequent photographing operation may be prohibited when the accumulated amount equals the remaining capacity of hard-disk device 11.

The determination of whether or not the remaining capacity of hard-disk device 11 has equaled "0" may also be performed in the following manner. That is, when, for example, transferring image data to hard-disk device 11 every time a photographing operation is performed, the number of picture frames corresponding to the storage capacity of hard-disk device 11 may be set in advance in a down-counter. The value of the down-counter may be decremented by one every time image data for one picture frame is transferred to hard-disk device 11, and it may be determined that the remaining capacity of hard-disk device 11 has equaled "0" when the value of the down-counter has equaled "0".

Figure 3:
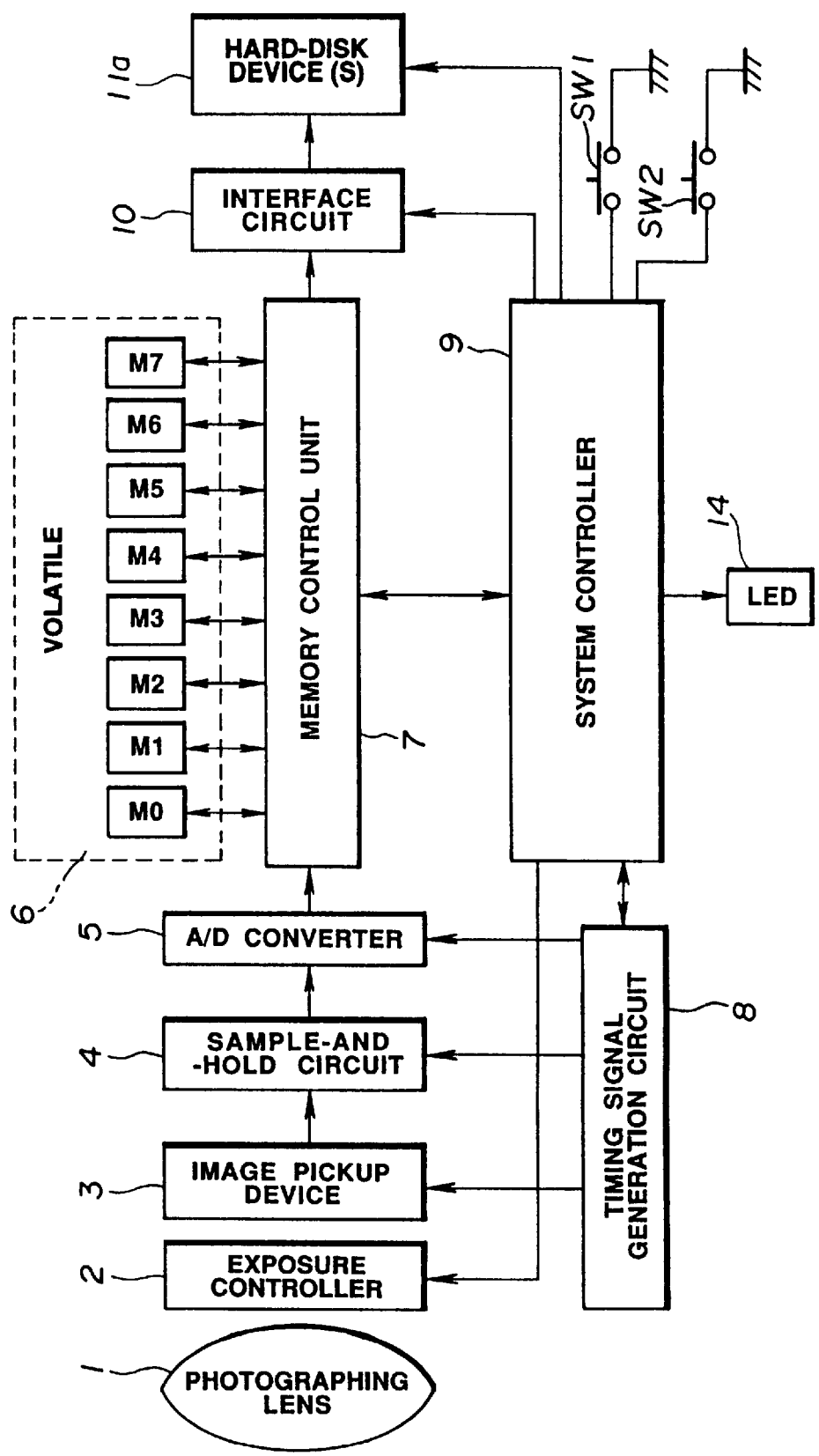
FIG. 3 is a block diagram illustrating the schematic configuration of an electronic camera according to a second embodiment of the present invention.

FIG. 3 is a block diagram illustrating the schematic configuration of an electronic camera according to a second embodiment of the present invention. Since the configuration of the hardware of this electronic camera is substantially the same as that of the electronic camera of the first embodiment shown in FIG. 1, only components which are different from those shown in FIG. 1 will be briefly described.

The configuration of the hardware of the electronic camera of the second embodiment only differs from that of the electronic camera of the first embodiment shown in FIG. 1 in that LED's 14 and 15 are not provided. In the second embodiment, when image data stored in internal memory 6 have reached a predetermined amount, hard-disk device 11 is started, and image data of the predetermined amount (for a predetermined number of picture frames) are transferred in a lump to hard-disk device 11.

Figure 4:
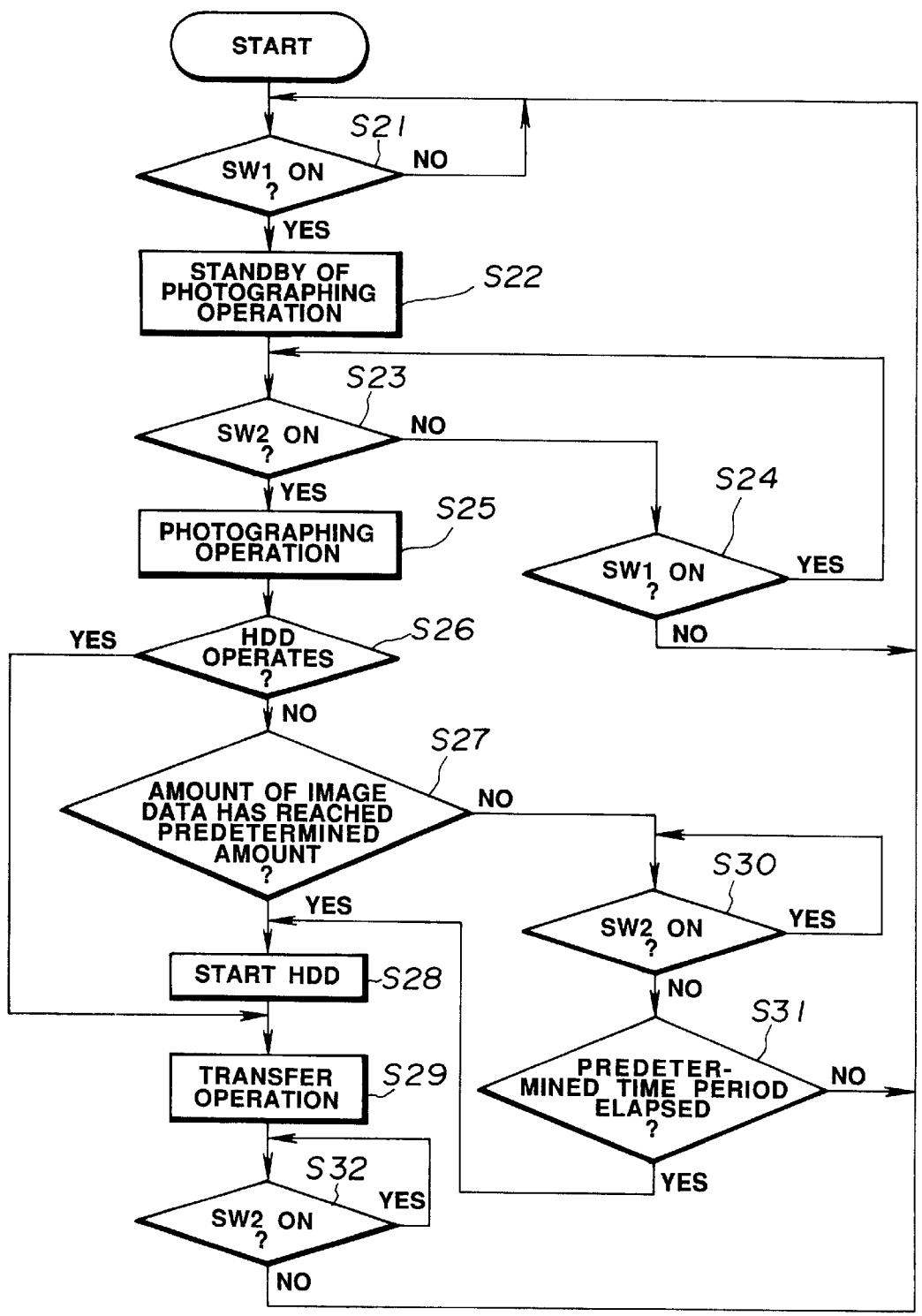
FIG. 4 is a flowchart illustrating a photographing operation of the electronic camera of the second embodiment.

Next, a description will be provided of a photographing operation of the electronic camera of the second embodiment with reference to the flowchart of FIG. 4.

System controller 9 first awaits a detection that switch SW1 is switched on (step S21), performs a photometric operation when switch SW1 has been switched on, and assumes a standby state of a photographing operation, in which, for example, the stop value and shutter speed are determined based on the result of the photometric operation (step S22). System controller 9 then determines whether or not switch SW2 is switched on (step S23). If the result of the determination is negative, system controller 9 determines whether or not switch SW1 is switched on (step S24). If the result of the determination in step S24 is affirmative, the process returns to step S23. If the result of the determination in step S24 is negative, the process returns to step S21.

If the result of the determination in step S23 is affirmative, a photographing operation is executed. That is, the shutter is opened by the control of exposure controller 2, and image data obtained from the route of image pickup device 3, sample-and-hold circuit 4 and A/D converter 5 is first stored in internal memory 6 (step S25).

Subsequently, system controller 9 determines whether or not hard-disk device 11 operates (step S26). If the result of the determination is affirmative, the process proceeds to step S31 (to be described later). If the result of the determination in step S26 is negative, system controller 9 determines whether or not the amount of image data stored in internal memory 6 has reached a predetermined amount (step S27). If the result of the determination is affirmative, hard-disk device 11 is started (step S28). At that time, system controller 9 turns on LED 16 in order to indicate that hard-disk device 11 operates. The transfer of image data stored in internal memory 6 to hard-disk device 11 is started. After the completion of the transfer of all the image data, the operation of hard-disk device 11 is stopped, and LED 16 is turned off (step S29).

If the result of the determination in step S27 is negative, system controller 9 first confirms that switch SW2 is switched off (step S30), and then determines whether or not a predetermined time period has elapsed after the storage of image data in internal memory 6 (step S31). If the result of the determination is negative, the process returns to step S21. If the result of the determination is affirmative, that is, if the predetermined time period has elapsed in a state in which the amount of photographed image data does not reach the predetermined amount, the process proceeds to the above-described steps S28 and S29. That is, hard-disk device 11 is started, and the image data after the lapse of the predetermined time period in the state in which the amount of photographed image data does not reach the predetermined amount are transferred to hard-disk device 11.

As described above, by transferring image data after the lapse of the predetermined time period to hard-disk device 11, it is possible to prevent the problem wherein electric power is turned off while image data remain in internal memory 6 without being transferred to hard-disk device 11, and the image data remaining in the volatile internal memory 6 are erased without being recorded and stored in hard-disk device 11 by the turning-off of the electric power.

After stopping the operation of hard-disk device 11 in step S29, system controller 9 confirms that switch SW2 is switched off (step S32), and the process returns to step S21. As can be surmised from the processing from step S26 to step S29, it is possible to perform the subsequent photographing operation even while image data are transferred to hard-disk device 11. In such a case, image data photographed during the transfer operation are first stored in internal memory 6, and are then immediately transferred to hard-disk device 11. However, image data photographed during the transfer operation are transferred after the last image data previously stored in internal memory 6 has been transferred.

As described above, in the present embodiment, when the amount of image data first stored in internal memory 6 has reached a predetermined amount, the stored image data are transferred in a lump to hard-disk device 11. Hard-disk device 11 is stopped except during the transfer operation. Hence, the number of starting and the time of driving hard-disk device 11 are reduced, causing a decrease in electric power consumption.

In the above-described second embodiment, the amount of image data to be transferred in a lump (the above-described predetermined amount) may be changed in accordance with the size of hard-disk device 11. In such a case, the amount of image data to be transferred in a lump may be increased as the size of hard-disk device 11 increases.

A device other than a hard-disk device, such as a memory card, a magnetic tape or the like, may also be used as the external storage device. Also in this case, it is desirable to change the amount of image data to be transferred in a lump in accordance with the kind of the external storage device. For example, the amount of image data may be reduced when a memory card is used, and may be increased when a magnetic tape is used.

Figure 5:
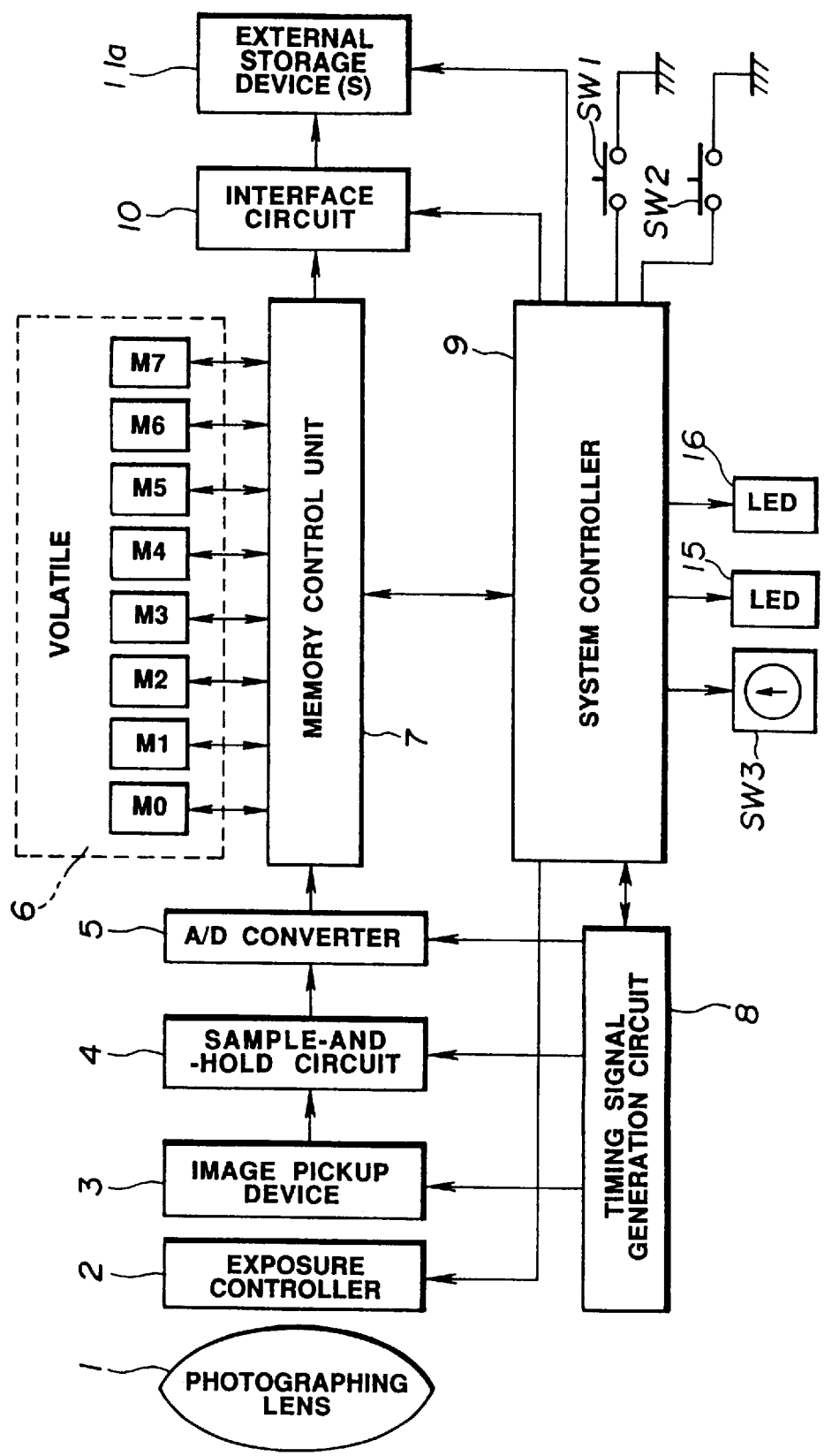
FIG. 5 is a block diagram illustrating the schematic configuration of an electronic camera according to a third embodiment of the present invention.

FIG. 5 is a block diagram illustrating the schematic configuration of an electronic camera according to a third embodiment of the present invention. Since the configuration of the hardware of this electronic camera is substantially the same as that of the electronic camera of the first embodiment shown in FIG. 1, only components which are different from those shown in FIG. 1 will be briefly described.

The configuration of the hardware of the electronic camera of the third embodiment differs from that of the electronic camera of the first embodiment shown in FIG. 1 in that LED 14 is not provided, and switch SW3 for setting the number of picture frames to be photographed is newly provided. Hard-disk device or devices 11 of the first embodiment shown in FIG. 1 is replaced by detachable external storage device or devices 11a, in consideration of a case of using a non-volatile external storage device, such as a memory card, a magnetic tape or the like in place of hard-disk device 11.

In the third embodiment, the speed (continuous-photographing speed) of storing image data in internal memory 6 is caused to be slightly greater than the speed of transferring image data from internal memory 6 to external storage device 11a, so that the amount of image data within internal memory 6 gradually increases. When the amount of image data within internal memory 6 is filled up, the subsequent photographing operation is prohibited. External storage device 11a is filled up when all the filled-up image data within internal memory 6 have been tranferred to external storage device 11a. In addition, an optimum continuous photographing speed is selected in accordance with the kind of external storage device 11a.

Figure 6:
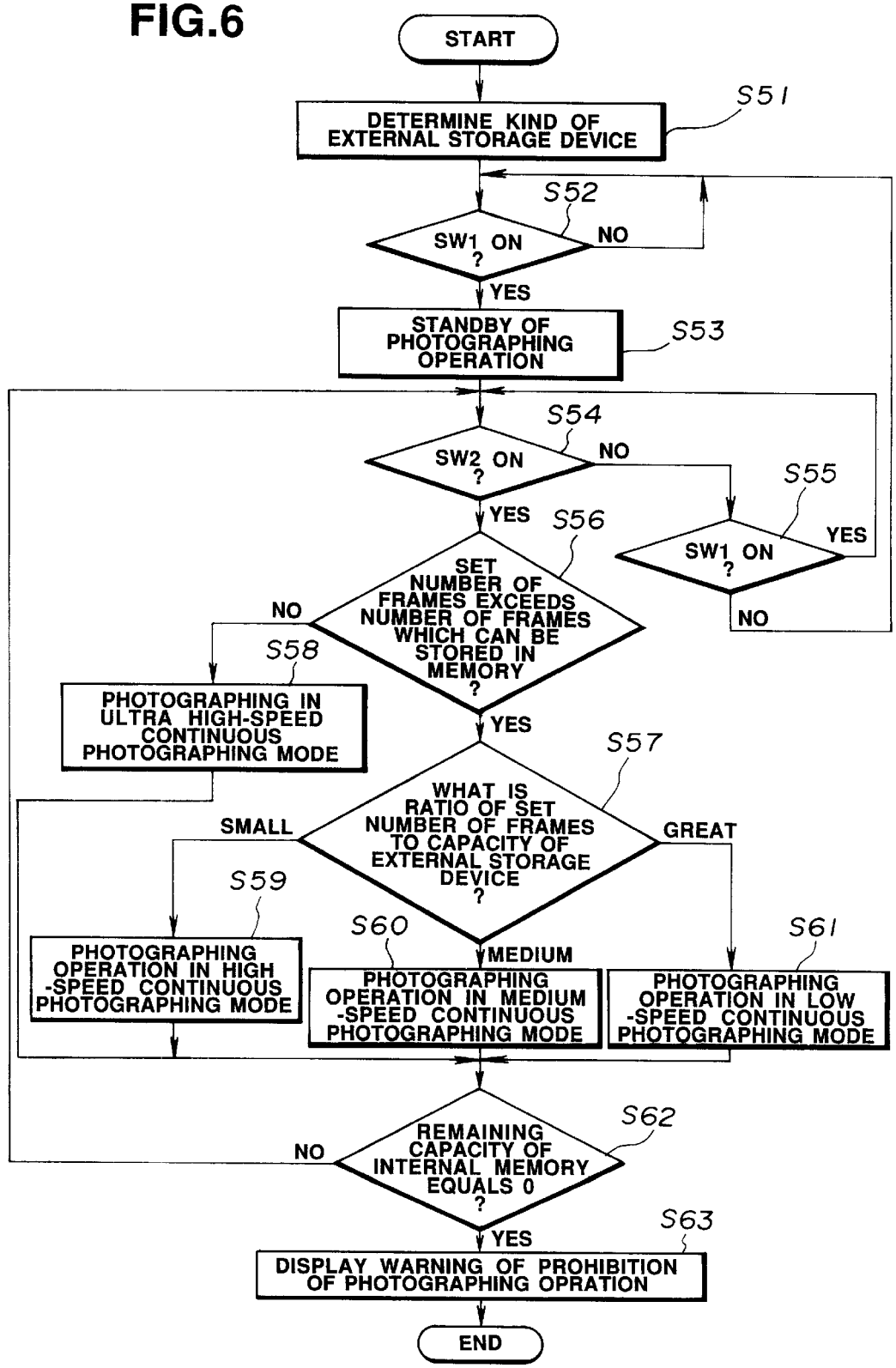
FIG. 6 is a flowchart illustrating a photographing operation of the electronic camera of the third embodiment.

Next, a description will be provided of a photographing operation of the electronic camera of the third embodiment with reference to the flowchart of FIG. 6.

System controller 9 first determines and sets the kind (including the size), remaining capacity, transfer speed and the like of the mounted external storage device 11a (step S51). Subsequently, system controller 9 awaits that switch SW1 is switched on (step S52). When switch SW1 has been switched on, system controller 9 performs a photometric operation, and assumes a standby state of a photographing operation, in which, for example, the stop value and shutter speed are determined based on the result of the photometric operation (step S53).

System controller 9 then determines whether or not switch SW2 is switched on (step S54). If the result of the determination is negative, system controller 9 determines whether or not switch SW1 is switched on (step S55). If the result of the determination in step S55 is affirmative, the process returns to step S54. If the result of the determination in step S55 is negative, the process returns to step S52.

If the result of the determination in step S54 is affirmative, system controller 9 determines whether or not the number of picture frames to be photographed (not the number of picture frames of a continuous photographing operation) preset by switch SW3 exceeds the number of image data which can be stored in internal memory 6 (step S56). If the result of the determination is negative, a photographing operation in an ultrahigh-speed continuous photographing mode is executed (step S58), since internal memory 6 is not filled up irrespective of the transfer speed to external storage device 11a even if image data are stored in internal memory 6 at high speed.

On the other hand, if the result of the determination in step S56 is affirmative, system controller 9 determines whether the ratio of the set number of picture frames to be photographed to the storage capacity of external storage device 11a is great, medium or small (step S57). If the ratio is small, a photographing operation in a high-speed continuous photographing mode is executed (step S59). If the ratio is medium, a photographing operation in a medium-speed continuous photographing mode is executed (step S60). If the ratio is great, a photographing operation in a low-speed continuous photographing mode is executed (step S61).

In each of photographing operations in ultrahigh-speed, high-speed, medium-speed and low-speed continuous photographing modes in steps S58–S61, respectively, image data from solid-state image pickup device 3 are obtained and stored in internal memory 6, transfer of stored image data to external storage device 11a is started, and the subsequent photographing operation is interrupted for a time period which depends on the transfer speed of image data to external storage device 11a and the storage capacity of external storage device 11a. In each of photographing operations in high-speed, medium-speed and low-speed continuous photographing modes in steps S59–S61, respectively, the continuous photographing speed is caused to be more or less higher than the transfer speed of image data to external storage device 11a, so that image data are gradually stored in internal memory 6. In such a case, when new image data have been stored while image data within internal memory 6 are transferred, the fact is memorized. After transferring all old image data within internal memory 6, newly stored image data are transferred. That is, the subsequent image data is transferred after transferring all image data for respective picture frames without interrupting the transfer of image data for one frame.

As described above, by causing the continuous photographing speed to be more or less greater than the transfer speed of image data to external storage device 11a, image data are gradually stored in internal memory 6. The storage capacities of internal memory 6 and external storage device 11a are determined so that the remaining capacity of external storage device 11a equals the storage capacity of internal memory 6 when internal memory 6 is filled up.

Suppose, for example, that internal memory 6 can store image data for 10 picture frames and external storage device 11a can store image data for 100 picture frames. Also suppose that the relationship between the transfer speed of image data to external storage device 11a and the storage speed (continuous photographing speed) of image data to internal memory 6 is set so that the subsequent image data is stored in internal memory 6 when 90% of image data for one picture frame has been tranferred to external storage device 11a.

In this case, the amount of image data within internal memory 6 increases by an amount corresponding to 10% of image data for one picture frame after completing the transfer of image data for one picture frame. That is, every time when the transfer of image data for ten picture frames has been completed, the amount of image data within internal memory 6 increases by the amount of data for one picture frame. When the amount of image data within internal memory 6 has reached the critical amount corresponding to 10 picture frames, image data for 90 picture frames are stored in external storage device 11a. Accordingly, if the subsequent photographing operation is prohibited when the amount of image data within internal memory 6 has reached the critical amount corresponding to 10 picture frames, and image data for 10 picture frames within internal memory 6 are transferred, image data for 100 picture frames corresponding the critical amount are recorded and stored in external storage device 11a.

In consideration of the foregoing description, after performing processing of one of steps S58–S61, system controller 9 determines whether or not the remaining amount of internal memory 6 equals "0", that is, internal memory 6 has been filled up (step S62). If the result of the determination is negative, the process returns to step S54. If the result of the determination in step S62 is affirmative, LED 14 is turned on to warn the photographer of the prohibition of the subsequent photographing operation (step s63), and the process is terminated.

As described above, in the present embodiment, the speed (continuous photographing speed) of storing image data in internal memory 6 is caused to be more or less higher than the speed of transferring image data from internal memory 6 to external storage device 11a, so that the amount of image data within internal memory 6 gradually increases. The subsequent photographing operation is prohibited after internal memory 6 has been filled up with image data, and external storage device 11a is filled up when all of the image data within the filled-up internal memory 6 have been transferred. It is thereby possible to perform a continuous photographing operation at an appropriate continuous photographing speed corresponding to the transfer speed of external storage device 11a, and to record and store all of photographed image data.

As described above, in the electronic camera of the present embodiment, it is possible to securely record and store photographed image data. In addition, it is possible to reduce electric power consumption by efficiently transferring image data temporarily stored in a volatile memory to a non-volatile memory. Furthermore, it is possible to perform a continuous photographing operation at an appropriate continuous photographing speed without interrupting the continuous photographing operation, and to record and store all of the photographed image data.

The individual components shown in outline or designated by blocks in the drawings are all well-known in the image signal recording apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image signal recording apparatus for recording image signals, said image signal recording apparatus comprising:

image pickup means for obtaining an image of an object, and for outputting an image signal corresponding to the obtained image;

first memory means having a predetermined storage capacity for temporarily storing the image signal output from said image pickup means, and for outputting the temporarily stored image signal;

second memory means for storing the image signal output from said first memory means;

first detection means for detecting the amount of image signals stored in said first memory means;

second detection means for detecting the storage capacity of image signals in said second memory means; and image-pickup-operation prohibition means for directly comparing the amount of image signals stored in said first memory means with the storage capacity of said second memory means, and for prohibiting the image-pickup operation of said image pickup means when the amount of image signals stored in said first memory means equals the storable capacity remaining in said second memory means as the result of a comparison between the detection results of said first and second detection means.

2. An image signal recording apparatus according to claim 1, wherein said second memory means is detachable with respect to said image signal recording apparatus and comprises a plurality of memory devices of different kinds.

3. An image signal recording apparatus according to claim 1, wherein said second memory means is detachable with respect to said image signal recording apparatus and comprises a plurality of hard-disk devices having different speeds of recording of the image signal.

4. An image signal recording apparatus for receiving and recording image signals, said image signal recording apparatus comprising:

first memory means having a predetermined storage capacity for receiving an image signal, for temporarily storing the image signal, and for outputting the temporarily stored image signal;

second memory means for storing the image signal output from said first memory means;

first detection means for detecting the amount of image signals stored in said first memory means;

second detection means for detecting the storage capacity of image signals in said second memory means; and image-signal-storage prohibition means for directly comparing the amount of image signals stored in said first memory means with the storage capacity of said second memory means, and for prohibiting a storing operation of the image signal in said first memory means when the amount of image signals stored in said first memory means equals the storable capacity remaining in said second memory means as the result of a comparison between the detection results of said first and second detection means.

5. An image signal recording apparatus according to claim 4, further comprising image pickup means for obtaining an image of an object, and for outputting an image signal corresponding to the obtained image to said first memory means.

6. An image signal recording apparatus according to claim 4, wherein said second memory means comprises a plurality of different kinds of memory devices which are detachable with respect to said image signal recording apparatus.

7. An image signal recording apparatus according to claim 4, wherein said second memory means comprises a plurality of different kinds of hard-disk devices having different storage speeds for image signals, which devices are detachable with respect to said image signal recording apparatus.

8. An image signal recording apparatus for recording image signals, said image signal recording apparatus comprising:

image pickup means for obtaining images of objects, and for sequentially and continuously outputting image signals corresponding to the obtained images in units of a picture frame;

first memory means having a predetermined storage capacity for temporarily storing the image signals output from said image pickup means, and for outputting the temporarily stored image signals;

second memory means for storing the image signals output from said first memory means; and control means for controlling the storing of the image signals in said first memory means and outputting the stored image signals therefrom, and for directly comparing the amount of image signals stored in said first memory means with the storage capacity of said second memory means, and for prohibiting the image-pickup operation of said image pickup means when the amount of image signals stored in said first memory means equals a storable capacity remaining in said second memory means.

9. An image signal recording apparatus according to claim 8, wherein said second memory means is detachable with respect to said image signal recording apparatus and comprises a plurality of memory devices of different kinds, and wherein said control means is arranged so as to change a speed of the continuous image pickup operation and a speed of storage of the image signals in said first memory means in accordance with the kind of memory device selected from said plurality of memory devices and mounted on said image signal recording apparatus.

10. An image signal recording apparatus according to claim 8, wherein said second memory means is detachable with respect to said image signal recording apparatus and comprises a plurality of hard-disk devices having different speeds of recording of the image signal, and wherein said control means is arranged so as to change a speed of the continuous image pickup operation and a speed of storage of the image signals in said first memory means in accordance with the kind of hard-disk device selected and mounted on said image signal recording apparatus.

11. An image signal recording apparatus for recording image data such that the image data is first temporarily stored in a volatile memory and then transferred to a non-volatile memory, said apparatus comprising:

first detection means for determining whether the remaining capacity in said volatile memory has reached a predetermined amount;

second detection means for detecting the stored capacity of image signals in the non-volatile memory;

comparing means for directly comparing the amount of image signals stored in said volatile memory with the storage capacity of the non-volatile memory; and notifying means for notifying a user that the non-volatile memory cannot further record image data if said first detection means determines that the remaining capacity of said volatile memory has reached the predetermined amount.

12. Apparatus according to claim 11, wherein said second detection means determine whether the remaining capacity of said non-volatile memory has become equal to or less than the storage capacity of said volatile memory, and wherein said notifying means notifies the user that said non-volatile memory cannot store further image data if said second detection means determines that the remaining capacity of the non-volatile memory has become equal to or less than the storage capacity of said volatile memory or if said first detection means determines that the remaining capacity of said volatile memory has reached said predetermined amount.

13. Apparatus according to claim 11, further comprising:

image pickup means having a photoelectric conversion device for generating image data by photoelectric conversion, and for outputting the resultant image data; and control means for interrupting a photographing operation of said image pickup means if said first detection means determines that the remaining capacity of said volatile memory has reached said predetermined amount.

14. Apparatus according to claim 13, wherein said second detection means determines whether the remaining capacity of said non-volatile memory has become equal to or less than the storage capacity of said volatile memory, and wherein said notifying means notifies the user that said non-volatile memory cannot store further image data if said second detection means determines that the remaining capacity of said non-volatile memory has been equal to or less than the storage capacity of said volatile memory or if said first detection means determines that the remaining capacity of said volatile memory has reached said predetermined amount, and wherein said control means interrupts the photographing operation of the image pickup means if said second detection means determines that the remaining capacity of said non-volatile memory has become equal to or less than the storage capacity of said volatile memory or that the remaining capacity of said volatile memory has reached said predetermined amount.

15. Apparatus according to claim 11, wherein said non-volatile memory comprises a plurality of different types of memory devices which are detachable from said image signal recording apparatus.

16. Apparatus according to claim 11, wherein said non-volatile memory comprises a plurality of different types of hard-disk devices which are different in image data writing speed and which are detachable from said image signal recording apparatus.

17. An image signal recording apparatus for recording image data such that the image data is first temporarily stored in a volatile memory and then transferred to a non-volatile memory, said apparatus comprising:

first detection means for determining whether the accumulated amount of image data temporarily stored in said volatile memory has reached a predetermined value;

second detection means for detecting the stored capacity of image signals in the non-volatile memory;

comparing means for directly comparing the amount of image signals stored in said volatile memory with the storage capacity of the non-volatile memory; and notifying means for notifying a user that said non-volatile memory cannot store further image data if said first detection means determines that the accumulated amount of image data temporarily stored in said volatile memory has reached said predetermined value.

18. Apparatus according to claim 17, wherein said second detection means determines whether the remaining capacity of said non-volatile memory has become equal to or less than the storage capacity of said volatile memory, and wherein said notifying means notifies the user that said non-volatile memory cannot store further image data if said second detection means determines that the remaining capacity of said non-volatile memory has become equal to or less than the storage capacity of said volatile memory or if said first detection means determines that the accumulated amount of image data temporarily stored in said volatile memory has reached said predetermined value.

19. Apparatus according to claim 17, further comprising:

image pickup means comprising a photoelectric conversion device for converting a received optical image and outputting image data; and control means for interrupting a photographing operation of said image pickup means if said first detection means determines that the accumulated amount of image data temporarily stored in said volatile memory bas reached said predetermined value.

20. Apparatus according to claim 19, wherein said second detection means determines whether the remaining capacity of said non-volatile memory has become equal to or less than the storage capacity of said volatile memory, and wherein said notifying means notifies the user that the non-volatile memory cannot store further image data if said second detection means determines that the remaining capacity of said non-volatile memory has become equal to or less than the storage capacity of said volatile memory or if said first detection means determines that the accumulated amount of image data stored in said volatile memory has reached said predetermined values and wherein said control means interrupts the photographing operation of said image pickup means if said second detection means determines that the remaining capacity of said non-volatile memory has become equal to or less than the storage capacity of said volatile memory or if said first detection means determines that the accumulated amount of image data temporarily stored in said volatile memory has reached said predetermined value.

21. Apparatus according to claim 17, wherein said non-volatile memory comprises a plurality of different types of memory devices which are detachable from said image signal recording apparatus.

22. Apparatus according to claim 17, wherein said non-volatile memory comprises a plurality of different types of hard-disk devices which are different in image data writing speed and which are detachable from said image signal recording apparatus.

23. An image signal recording apparatus for recording image data such that the image data is first temporarily stored in a volatile memory and then transferred to a non-volatile memory, said apparatus comprising:

first detection means for determining whether the remaining capacity of said volatile memory has reached a predetermined amount;

second detection means for detecting the stored capacity of image signals in the non-volatile memory;

comparing means for directly comparing the amount of image signals stored in said volatile memory with the storage capacity of the non-volatile memory; and control means for disabling the operation of writing image data into said non-volatile memory if said first detection means determines that the remaining capacity of said volatile memory has reached said predetermined amount.

24. Apparatus according to claim 23, wherein said second detection means determines whether the remaining capacity of said non-volatile memory has become equal to or less than the storage capacity of said volatile memory, and wherein said control means disables the operation of writing image data into said volatile memory if said second detection means determines that the remaining capacity of said non-volatile memory has become equal to or less than the storage capacity of said volatile memory or if said first detection means determines that the remaining capacity of said volatile memory has reached said predetermined amount.

25. Apparatus according to claim 23, wherein said image signal recording apparatus further comprises image pickup means, including a photoelectric conversion device, for converting an optical image into resultant image data, and wherein said control means interrupts the photographing operation of said image pickup means if said first detection means determines that the remaining capacity of said volatile memory has reached said predetermined amount.

26. Apparatus according to claim 25, wherein said second detection means determines whether the remaining capacity of said non-volatile memory has become equal to or less than the storage capacity of said volatile memory, and wherein said control means disables the photographing operation of said image pickup means and notifies the user that the photographing and recording operation has been disabled if said second detection means determines that the remaining capacity of said non-volatile memory has become equal to or less than the storage capacity of said volatile memory or if said first detection means determines that the remaining capacity of said volatile memory has reached said predetermined amount.

27. Apparatus according to claim 23, wherein said non-volatile memory comprises a plurality of different types of memory devices which are detachable from said image signal recording apparatus.

28. Apparatus according to claim 23, wherein said non-volatile memory comprises a plurality of different types of hard-disk devices which are different in image data writing speed and which are detachable from said image signal recording apparatus.

29. An image signal recording apparatus for recording image data such that the image data is first temporarily recorded in a volatile memory, and then transferred to a non-volatile memory, said apparatus comprising:

first detection means for determining whether the accumulated amount of image data temporarily stored in said volatile memory has reached a predetermined value;

second detection means for detecting the stored capacity of image signals in the non-volatile memory;

comparing means for directly comparing the amount of image signals stored in said volatile memory with the storage capacity of the non-volatile memory; and control means to disable the operation of writing image data into said non-volatile memory if said first detection means determines that the accumulated amount of image data temporarily stored in said volatile memory has reached said predetermined value.

30. Apparatus according to claim 29, wherein said second detection means determines whether the remaining capacity of said non-volatile memory has become equal to or less than the storage capacity of said volatile memory, and wherein said control means disables the operation of writing image data into said volatile memory if said second detection means determines that the remaining capacity of said non-volatile memory has become equal to or less than the storage capacity of said volatile memory or if said first detection means determines that the accumulated amount of image data temporarily stored in said volatile memory has reached said predetermined value.

31. Apparatus according to claim 29, therein said image signal recording apparatus further comprises image pickup means, including a photoelectric conversion device, for converting an optical image into resultant image data, and wherein the control means interrupts the photographing operation of said image pickup means if said first detection means determines that the accumulated amount of image data temporarily stored in said volatile memory has reached said predetermined value.

32. Apparatus according to claim 31, wherein said second detection means determines whether the remaining capacity of said non-volatile memory has become equal to or less than the storage capacity of said volatile memory, and wherein said control means disables the photographing operation of said image pickup means and notifies the user that the photographing and recording operation has become disabled if said second detection means determines that the remaining capacity of said non-volatile memory has become equal to or less than the storage capacity of said volatile memory or if said first detection means determines that the accumulated amount off image data temporarily stored in said volatile memory has reached said predetermined value.

33. Apparatus according to claim 29, wherein said non-volatile memory comprises a plurality of different types of memory devices which are detachable from said image signal recording apparatus.

34. Apparatus according to claim 29, wherein said non-volatile memory comprises a plurality of different types of hard-disk devices which are different in image data writing speed and which are detachable from said image signal recording apparatus.

35. An image signal recording apparatus for recording image data such that the image data is first temporarily stored in a volatile memory and then transferred to a non-volatile memory, said apparatus comprising:

first detection means for detecting the remaining capacity in said volatile memory;

second detection means for detecting the stored capacity of image signals in the non-volatile memory;

comparing means for directly comparing the amount of image signals stored in said volatile memory with the storage capacity of the non-volatile memory; and notifying means for notifying a user that said non-volatile memory cannot store further image data if the remaining capacity of said volatile memory detected by said first detection means has reached a predetermined amount.

36. Apparatus according to claim 35, wherein said second detection means detects the remaining capacity of said non-volatile memory, and wherein said notifying means notifies the user that said non-volatile memory cannot store further image data, in accordance with the result of the comparison between the remaining capacity of said volatile memory and the remaining capacity of said non-volatile memory as detected by said second detection means.

37. Apparatus according to claim 35, further comprising:

image pickup means, hating a photoelectric conversion device, for receiving an optical image and converting it into image data; and control means for interrupting the photographing operation of said image pickup means if the remaining capacity of said volatile memory detected by said first detection means has reached said predetermined amount.

38. Apparatus according to claim 37, wherein said second detection means detects the remaining capacity of said non-volatile memory, and wherein said notifying means is arranged to notify the user that said non-volatile memory cannot store further image data, in accordance with the result of the comparison between the remaining capacity of said volatile memory and the remaining capacity of said non-volatile memory as detected by said second detection means, and wherein said control means interrupts the photographing operation of said image pickup means, in accordance with the result of the comparison between the remaining capacity of said volatile memory and the remaining capacity of said non-volatile memory as detected by said second detection means.

39. Apparatus according to claim 35, wherein said non-volatile memory comprises a plurality of different types of memory devices which are detachable from said image signal recording apparatus.

40. Apparatus according to claim 35, wherein said non-volatile memory comprises a plurality of different types of hard-disk devices which are different in image data writing speed and which are detachable from said image signal recording apparatus.

41. An image signal recording apparatus for recording image data such that the image data is first temporarily stored in a volatile memory and then transferred to a non-volatile memory, said apparatus comprising:

first detection means for detecting the accumulated amount of image data temporarily stored in said volatile memory;

second detection means for detecting the stored capacity of image signals in the non-volatile memory;

comparing means for directly comparing the amount of image signals stored in said volatile memory with the storage capacity of the non-volatile memory; and notifying means for notifying a user that said non-volatile memory cannot store further image data if the accumulated amount of image data temporarily stored in said volatile memory, as detected by said first detection means, has reached a predetermined value.

42. Apparatus according to claim 41, wherein said second detection means detects the remaining capacity of said non-volatile memory, and wherein said notifying means notifies the user that said non-volatile memory cannot store further image data, in accordance with the result of the comparison between the accumulated amount of image data temporarily stored in said volatile memory and the remaining capacity of said non-volatile memory as detected by said second detection means.

43. Apparatus according to claim 41, further comprising:

image pickup means, having a photoelectric conversion device, for converting a received optical image into resultant image data; and control means for interrupting the photographing operation of said image pickup means if the accumulated amount of image data temporarily stored in said volatile memory detected by said first detection means has reached said predetermined value.

44. Apparatus according to claim 43, wherein said second detection means detects the remaining capacity of said non-volatile memory, and wherein said notifying means notifies the user that said non-volatile memory cannot store further image data, in accordance with the result of the comparison between the accumulated amount of image data temporarily stored in said volatile memory and the remaining capacity of said non-volatile memory as detected by said second detection means, and wherein said control means interrupts the photographing operation of said image pickup means, in accordance with the result of the comparison between the accumulated amount of image data temporarily stored in said volatile memory and the remaining capacity of said non-volatile memory as detected by said second detection means.

45. Apparatus according to claim 41, wherein said non-volatile memory comprises a plurality of different types of memory devices which are detachable from said image signal recording apparatus.

46. Apparatus according to claim 41, wherein said non-volatile memory comprises a plurality of different types of hard-disk devices which are different in image data writing speed and which are detachable from said image signal recording apparatus.

47. An image signal recording apparatus for recording image data such that the image data is first temporarily stored in a volatile memory and then transferred to a non-volatile memory, said apparatus comprising:

first detection means for detecting the remaining capacity of said volatile memory;

second detection means for detecting the stored capacity of image signals in the non-volatile memory;

comparing means for directly comparing the amount of image signals stored in said volatile memory with the storage capacity of the non-volatile memory; and control means for disabling the operation of writing image data into said non-volatile memory if the remaining capacity of said volatile memory, as detected by said first detection means, has reached said predetermined amount.

48. Apparatus according to claim 47, wherein said second detection means detects the remaining capacity of said non-volatile memory, and wherein said control means disables the operation of writing image data into said volatile memory, in accordance with the result of the comparison between the remaining capacity of said volatile memory and the remaining capacity of said non-volatile memory as detected by said second detection means.

49. Apparatus according to claim 47, wherein said image signal recording apparatus further comprises image pickup means, including a photoelectric conversion device, for receiving an optical image and converting it to resultant image data, and wherein said control means interrupts the photographing operation of said image pickup means if the remaining capacity in said volatile memory, as detected by said first detection means, has reached said predetermined amount.

50. Apparatus according to claim 49, wherein said second detection means detects the remaining capacity of said non-volatile memory, and wherein said control means interrupts the photographing operation of said image pickup means and notifies the user that the photographing and recording operation has become disabled, in accordance with the result of the comparison between the remaining capacity of said volatile memory and the remaining capacity of said non-volatile memory as detected by said second detection means.

51. Apparatus according to claim 47, wherein said non-volatile memory comprises a plurality of different types of memory devices which are detachable from said image signal recording apparatus.

52. Apparatus according to claim 47, wherein said non-volatile memory comprises a plurality of different types of hard-disk devices which are different in image data writing speed and which are detachable from said image signal recording apparatus.

53. An image signal recording apparatus for recording image data such that the image data is first temporarily stored in a volatile memory and then transferred to a non-volatile memory, said apparatus comprising:

first detection means for detecting the accumulated amount of image data temporarily stored in said volatile memory;

second detection means for detecting the stored capacity of image signals in the non-volatile memory;

comparing means for directly comparing the amount of image signals stored in said volatile memory with the storage capacity of the non-volatile memory; and control means for disabling the operation of writing image data into said non-volatile memory if the accumulated amount of image data temporarily stored in said volatile memory, as detected by said first detection means, has reached said predetermined value.

54. Apparatus according to claim 53, wherein said second detection means detects the remaining capacity of said non-volatile memory, and wherein said control means disables the operation of writing image data in said volatile memory, in accordance with the result of the comparison between the accumulated amount of image data temporarily stored in said volatile memory and the remaining capacity of said non-volatile memory as detected by said second detection means.

55. Apparatus according to claim 53, wherein said image signal recording apparatus further comprises image pickup means having a photoelectric conversion device, for converting a received optical image into resultant image data, and wherein said control means interrupts the photographing operation of said image pickup apparatus if said the accumulated amount of image data temporarily stored in said volatile memory, as detected by said first detection means, has reached said predetermined value.

56. Apparatus according to claim 55, wherein said second detection means detects the remaining capacity of said non-volatile memory, and wherein said control means disables the photographing operation of said image pickup means and notifies the user that the photographing and recording operation has become disabled, in accordance with the result of the comparison between the accumulated amount of image data temporarily stored in said volatile memory and the remaining capacity of said non-volatile memory as detected by said second detection means.

57. Apparatus according to claim 53, wherein said non-volatile memory comprises a plurality of different types of memory devices which are detachable from said image signal recording apparatus.

58. Apparatus according to claim 53, wherein said non-volatile memory comprises a plurality of different types of hard-disk devices which are different in image data writing speed and which are detachable from said image signal recording apparatus.

* * * * *

UNITED STATES PATENT AND TRADEMARK OFFICE
CERTIFICATE OF CORRECTION

PATENT NO. : 5,852,467

DATED : December 22, 1999

INVENTOR(S) : HIROYUKI OGINO

It is certified that error appears in the above-identified patent and that said Letters Patent is hereby corrected as shown below:

COLUMN 1,
Line 6, insert --This patent issued on a continued prosecution application filed under 37 C.F.R. 1.53(d) and is subject to the twenty year patent term provisions of 35 U.S.C. 154(a)(2)--; and
Line 7, "08,465,570" should read --08/465,570--.

COLUMN 3,
Line 64, "order warn" should read --order to warn--.

COLUMN 7,
Line 61, "tranferred" should read --transferred--.

COLUMN 9,
Line 14, "transferred" should read --forward--;
Line 20, "when" should be deleted; and
Line 32, "the" should read --to the--.

COLUMN 12
Line 18, "determine" should read --determines--.

UNITED STATES PATENT AND TRADEMARK OFFICE
CERTIFICATE OF CORRECTION

PATENT NO. : 5,852,467

DATED : December 22, 1999

INVENTOR(S) : HIROYUKI OGINO

It is certified that error appears in the above-identified patent and that said Letters Patent is hereby corrected as shown below:

COLUMN 13,
Line 37, "bas" should read --has--; and
Line 50, "values" should read --value,--.

COLUMN 15,
Line 22, "therein" should read --wherein--; and
Line 41, "off" should read --of--.

COLUMN 16,
Line 9, "hating" should read --having--.

COLUMN 18,
Line 44, "said the" should read --said--.

Signed and Sealed this

Fifth Day of October, 1999

Attest:

Q. TODD DICKINSON

Attesting Officer     Acting Commissioner of Patents and Trademarks